(12) United States Patent
Kahkonen et al.

(10) Patent No.: US 9,302,411 B2
(45) Date of Patent: Apr. 5, 2016

(54) STONE SAW

(71) Applicant: Nurmeksen Tyosto ja Tarvike Oy, Nurmes (FI)

(72) Inventors: Marko Kahkonen, Nurmes (FI); Mika Kahkonen, Nurmes (FI)

(73) Assignee: NURMEKSEN TYOSTO JA TARVIKE OY, Nurmes (FI)

( * ) Notice: Subject to any disclaimer, the term of this patent is extended or adjusted under 35 U.S.C. 154(b) by 0 days.

(21) Appl. No.: 14/190,391

(22) Filed: Feb. 26, 2014

(65) Prior Publication Data

US 2014/0238375 A1    Aug. 28, 2014

(51) Int. Cl.
*B28D 7/02*    (2006.01)
*B28D 1/04*    (2006.01)
*B23D 59/02*    (2006.01)

(52) U.S. Cl.
CPC ............... *B28D 7/02* (2013.01); *B23D 59/025* (2013.01); *B28D 1/047* (2013.01)

(58) Field of Classification Search
CPC .................................... B28D 7/02; B28D 1/04

USPC ............ 125/13.01, 15; 451/450, 53, 541, 488
See application file for complete search history.

(56) References Cited

U.S. PATENT DOCUMENTS

| | | | | | |
|---|---|---|---|---|---|
| 2,378,070 | A | * | 6/1945 | Eastwood | 451/450 |
| 2,557,251 | A | * | 6/1951 | Baker et al. | 125/13.01 |
| 3,144,739 | A | * | 8/1964 | Brutvan et al. | 451/543 |
| 3,282,263 | A | * | 11/1966 | Christensen et al. | 125/15 |
| 3,609,931 | A | * | 10/1971 | Voorhies | 451/450 |
| 4,333,371 | A | * | 6/1982 | Matsuda | 83/169 |
| 4,870,946 | A | * | 10/1989 | Long et al. | 125/13.01 |
| 5,846,125 | A | * | 12/1998 | Robichon | 451/450 |
| 8,641,479 | B2 | * | 2/2014 | Stephenson | 451/53 |
| 2011/0250827 | A1 | * | 10/2011 | Smith et al. | 451/449 |

* cited by examiner

*Primary Examiner* — Robert Rose
(74) *Attorney, Agent, or Firm* — Young & Thompson

(57) ABSTRACT

A stone saw for sawing drilling samples. The stone saw includes a rotation axle provided with an axial flushing channel. On the rotation axle a circular blade is arranged. On at least one side of the circular blade is a blade flange, which includes several spray openings that are connected to the flushing channel of the rotation axle. Flushing fluid may then be sprayed on a sawing site.

5 Claims, 2 Drawing Sheets

STONE SAW

BACKGROUND OF THE INVENTION

The invention relates to a stone saw that comprises a circular blade, against which a stone object is fed by means of a feeding device. During sawing, flushing fluid is fed to flush away the sawing sludge formed during sawing in the sawing site.

The field of the invention is described in more detail in the preamble of the independent claim of the application.

In the mining industry, there is a need to examine the mineral resources in the soil. The examination can be done by drilling holes in the rock with a sample drill that comprises a holesaw. This way, a sample that is an elongated cylindrical stone rod is detached from the rock. This sample drilling is also called rotary drilling and core drilling, and the rod-like sample is also called a drill core. The sample rod can be sawed across longitudinally so that more of the surface to be examined is revealed. A stone saw can be used to saw the sample. Typically stone saws comprise a vertical circular saw blade, against which the sample rod is fed horizontally by means of a feeding device. During sawing, flushing fluid is fed to the sawing site. However, drawbacks have been detected in the present stone sawing devices.

BRIEF DESCRIPTION OF THE INVENTION

It is an object of the present invention to provide a novel and improved stone saw.

The stone saw of the invention is characterized in that a rotation axle comprises at least one axial-direction flushing channel; that at least one blade flange comprises several crosswise spray openings that are connected to the flushing channel of the rotation axle; that the flushing channel of the rotation axle is connected to the feed channel of the flushing system; and that the flushing fluid is fed from said spray openings to the sawing site in the crosswise direction of the rotation axle.

The idea of the present solution is that the rotation axle of the stone saw is equipped with at least one axial flushing channel, whose length extends along at least part of the length of the rotation axle. On the rotation axle, on at least one side of the circular blade, a blade flange is arranged, the blade flange being an annular piece and comprising several spray openings that are connected to the flushing channel of the rotation axle. The spray openings are directed crosswise to the longitudinal axis of the rotation axle. It is then possible to feed flushing fluid through the spray openings to the sawing site in the crosswise direction of the rotation axle.

An advantage of the present solution is that the flushing fluid can be fed efficiently into the sawing site between the blade and sample. Thus, the feeding of the flushing fluid is controlled and directed more efficiently. Thanks to the more efficient flushing, the sawing speed may be higher than before, which naturally improves the efficiency of the device.

The idea of an embodiment is that there are blade flanges on both sides of the circular blade for fastening it to the rotation axle. One or both blade flanges may comprise spray openings.

The idea of an embodiment is that there is a blade flange on one side of the circular blade and a shoulder or some other mating surface on the other side. The shoulder may be formed on the rotation axle. The blade flange may be furnished with spray openings. Further, the shoulder may have a support surface on the side of the circular blade, the support surface being furnished with several grooves that extend to the outer surface of the rotation axle and form several spray openings.

The idea of an embodiment is that the rotation axle is hollow along at least part of its length.

The idea of an embodiment is that the rotation axle has two or more bores or channels that form the necessary axial flushing channels.

The idea of an embodiment is that a first blade flange and a second blade flange are both furnished with said spray openings. The flushing fluid is then sprayed to the sawing site from both sides of the blade disc of the circular blade. This embodiment further improves the removal of the sawing sludge formed during sawing from the sawing site and the cooling of the circular blade.

The idea of an embodiment is that there are 2 to 12 spray openings directed crosswise.

The idea of an embodiment is that there are 6 crosswise-directed spray openings on the blade flange or shoulder surface arranged against the circular blade.

The idea of an embodiment is that said spray openings are radially directed.

The idea of an embodiment is that said spray openings are directed crosswise to the center axis of the rotation axle, but at an angle to the radial direction. The angular position can be selected according to the rotation direction of the circular blade, for instance.

The idea of an embodiment is that the blade flange is an annular piece and comprises inner and outer circumferences. The blade flange also has an axial-direction support surface that may be arranged against the side of the blade disc of the circular blade. Further, the support surface has several grooves that extend from the inner circumference to the outer circumference of the blade flange and form spray channels together with the blade disc of the circular blade. Said spray channels are open on the outer circumference of the blade flange and, thus, form the spray openings, from which flushing fluid can be fed to the sawing site along the side of the blade disc of the circular blade.

The idea of an embodiment is that the support surface of the blade flange has several curved grooves for feeding flushing fluid. The grooves end on the outer circumference of the blade flange to form spray openings.

The idea of an embodiment is that the rotation axle comprises first and second ends. The first end is connected to the rotation device and the second end is free. The rotation axle comprises at least one axial flushing channel that extends from the second end of the rotation axle at least to the circular blade or blade flange. The flushing fluid is then fed from the free end side of the rotation axle.

The idea of an embodiment is that at least one end of the rotation axle is equipped with a rotating connector, to which a feed channel of the flushing system is connected. The rotation axle then has at least one axial flushing channel that extends from the end equipped with the rotating connector at least to the circular blade or blade flange.

The idea of an embodiment is that the flushing fluid is fed from the rotation device end.

The idea of an embodiment is that a feed chamber surrounds the rotation axle and is axially sealed to the rotation axle. Flushing fluid is fed to the feed chamber from a feed channel. The feed chamber is connected by one or more channels to an axial flushing channel in the rotation axle. The feed chamber can be located in a suitable location between the ends of the rotation axle.

The idea of an embodiment is that between the circular blade and first end, there is a support bearing, with which the rotation axle is supported to the frame. Between its outermost end and the support bearing, the rotation axle has a projecting section.

The idea of an embodiment is that the rotation axle is arranged horizontally. A stone object to be sawed is then fed horizontally toward the circular blade by means of a feeding device.

The idea of an embodiment is that the stone saw comprises means for collecting the sawing sludge formed during sawing. The sludge can be analyzed to obtain information on the sawed stone. Further, the stone object to be sawed may comprise valuable minerals, such as gold, that can now be recovered and utilized.

The idea of an embodiment is that the means for collecting sawing sludge comprise a collection chute that is arranged in connection with the feeding device of the stone saw. The collection chute is located below the stone object being sawed and the circular blade, whereby flushing fluid fed to the sawing site may flow to the collection chute below. In addition, the collection chute is arranged to be inclined in relation to the horizontal direction, whereby the flushing fluid flowing to the collection chute can flow away under gravity from below the sawing site. The bottom end of the collection chute is connected to a collection device or container, with which the sawing sludge is recovered.

The idea of an embodiment is that the stone saw is intended for sawing drill cores in soil testing. Drill cores are cylindrical stone rods that are sawed across in the longitudinal direction with a stone saw or into which one or more longitudinal saw grooves are sawed.

It should also be noted that the above-mentioned embodiments and the related features can also be combined. This way, it is possible to form for each purpose a suitable combination of the features.

BRIEF DESCRIPTION OF THE FIGURES

Some embodiments are explained in more detail in the accompanying drawings, in which.

For the sake of clarity, the figures show some embodiments in a simplified manner. In the figures, like reference numerals identify like elements.

DETAILED DESCRIPTION OF SOME EMBODIMENTS

Figure 1:
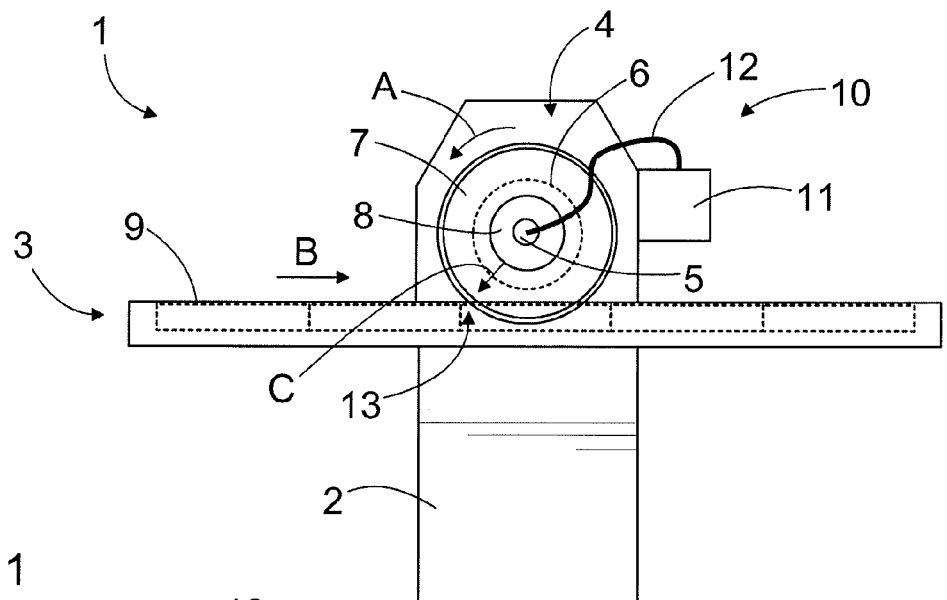
FIG. 1 is a schematic side view of a stone saw.

For the sake of clarity, FIG. 1 shows a highly simplified stone saw 1 that comprises a frame 2, feeding device 3 and sawing device 4. The sawing device 4 comprises a rotation axle 5 that is supported to the frame 2 and can be rotated A by means of a rotation device 6. A circular blade 7 can be fastened to the rotation axle 5 between blade flanges 8. A stone object to be sawed can be fastened to a fastening cassette 9 or a corresponding fastening element that can be fed B toward the rotating circular blade 7 during sawing. There may be several consecutive fastening cassettes 9 and they may be arranged on the feeding device 3 that may comprise a manual conveyance device or it may be equipped with a transfer conveyor, such as a belt conveyor. The stone saw 1 may be a horizontal machine tool, in which the rotation axle 5 and feed B are horizontal.

Further, the stone saw 1 comprises a flushing system 10 with at least one flushing unit 11, in which a required pressure is generated to the flushing fluid. The flushing unit 11 may comprise a pump for generating the required pressure and flow for the flushing fluid, which may be water, a mixture of water and one or more additives, or some other liquid. It is also possible that the flushing unit 11 comprises means for connecting to a pressure fluid network. From the flushing unit 11, the pressurized flushing fluid can be led along a feed channel 12 to the rotation axle 5 and onward along one or more axial flushing channels in the rotation axle to one or both blade flanges 8. The blade flange 8 has crosswise channels, grooves, or the like, along which the flushing fluid can be fed crosswise to the spray openings on the outer circumference of the blade flange 8, from which the flushing fluid is sprayed C crosswise. The spray C then hits the sawing site 13 well and flushes away the matter, such as chippings and the like, detached during sawing from the sawing site and also cools the working face on the outer circumference of the circular blade 7.

Figure 2:
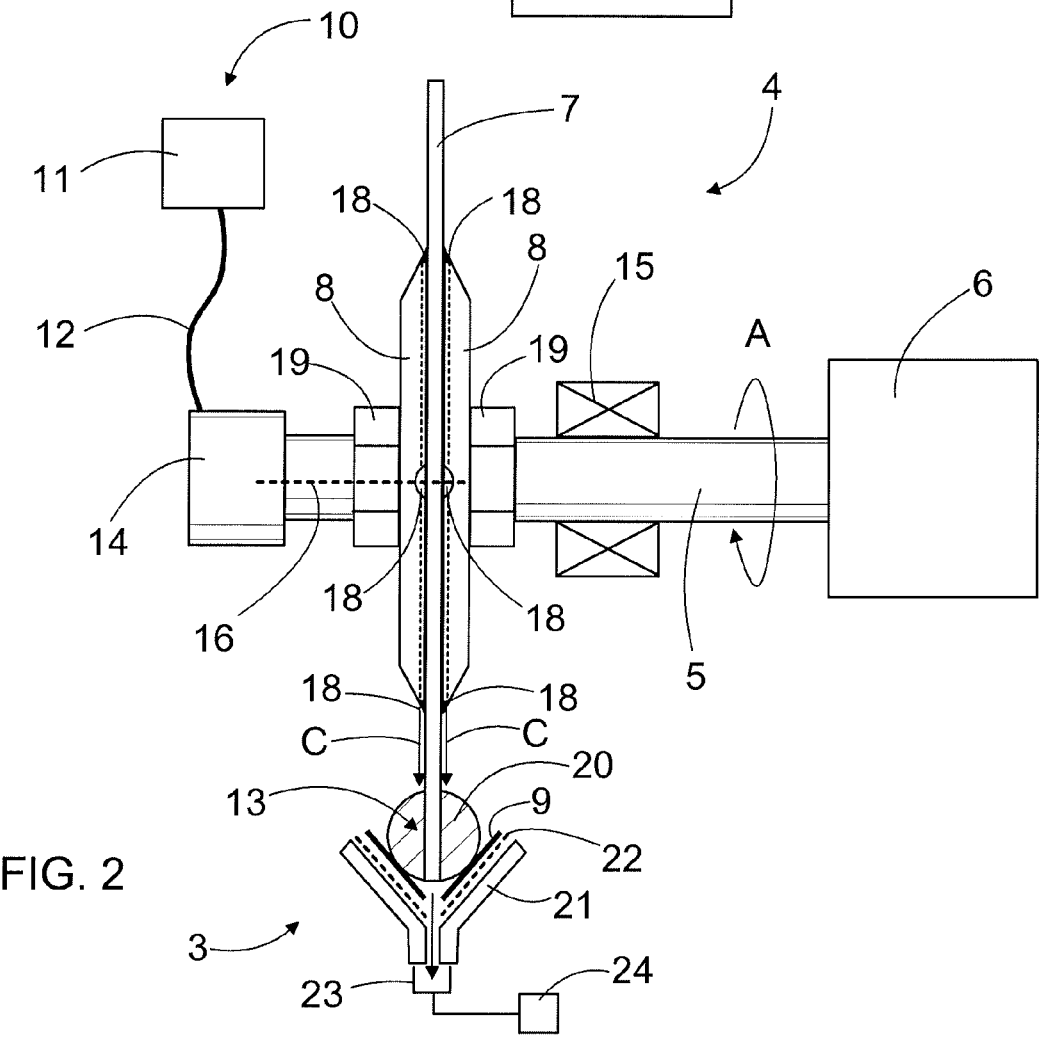
FIG. 2 is a schematic view showing a part of a stone saw as seen from the feed direction.

FIG. 2 shows a sawing device 4 with a rotation device 6 on one end of the rotation axle 5 and a rotating connector 14 on the opposite end. Further, the rotation axle 5 is supported to the frame by a support bearing 15 on the section between its ends. The rotating connector 14 is connected to the flushing unit 11 by means of a feed channel 12. The rotating connector 14 allows the rotation axle 5 to rotate A and lead the flushing fluid to an axial flushing channel 16 on the projecting section of the rotation axle 5. The flushing fluid can flow along the flushing channel 16 to the blade flanges 8 that have crosswise flushing channels 17 extending to the outer circumference of the blade flanges 8, where they form spray openings 18.

FIG. 2 shows that the blade flanges 8 can be pressed toward each other by means of nuts 19 or corresponding fastening elements.

FIG. 2 further shows in a simplified manner a stone rod 20 to be sawed and a cassette 9 with V-shaped support surfaces used to support and center the stone rod. The cassette 9 can be moved when it is supported by the feeding device 3. The feeding device 3 may have a support element 21 with conveyor belts 22 arranged against its upper surfaces. Both the bottom of the support element 21 and the bottom of the cassette 9 may have openings, from which the sawing sludge and flushing fluid can flow downward under gravity. On the side of the support element 21 bottom, there may be a collection chute 23, into which the sludge flows and with which it can be recovered and led to a collection device 24 or container. The solid matter in the recovered sawing sludge can be separated from the flushing fluid and then examined and analyzed. This way, additional sample data is obtained from the sample. Further, the solid matter in the sawing sludge may comprise valuable minerals, such as gold, that can now be recovered and utilized.

Figure 3:
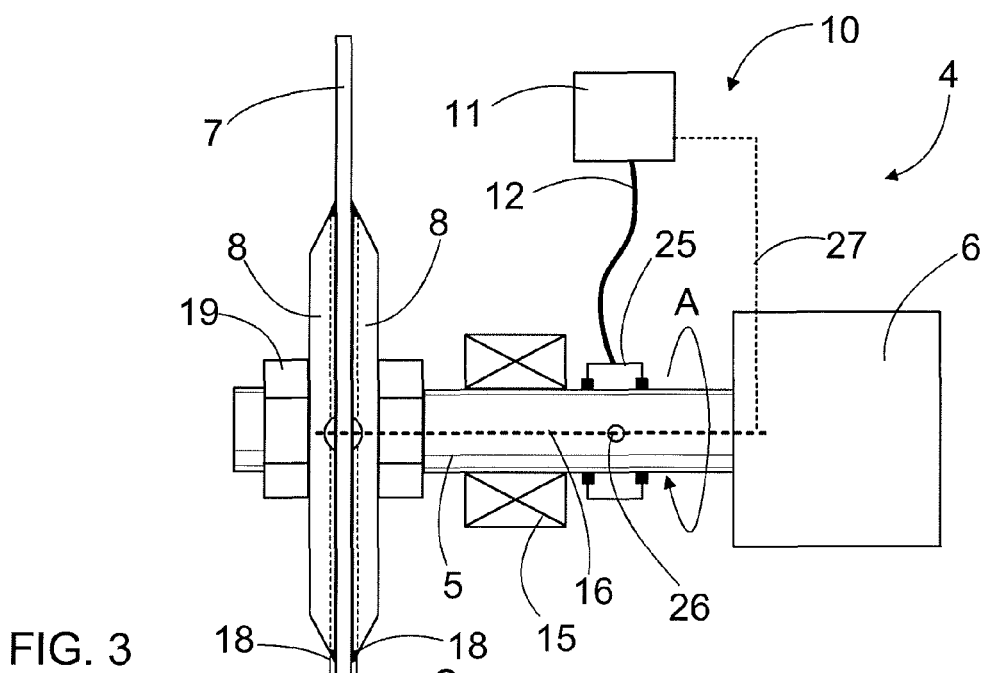
FIG. 3 is a schematic view showing a part of another stone saw as seen from the feed direction.

The sawing device 4 shown in FIG. 3 differs from the solution shown in FIG. 2 at least in that the flushing fluid is fed from the rotation device 6 side of the rotation axle 5. The axial flushing channel 16 is then on the opposite side of the circular blade 7 in relation to FIG. 2. FIG. 3 also shows two alternative arrangements for feeding flushing fluid into the flushing channel 16. The feed channel 12 may be connected to a feed chamber 25 sealed around the rotation axle 5, from which the flushing fluid enters the axial flushing channel 16 through one or more openings 26. Alternatively, the flushing channel 16 may extend to the rotation device 6 side end, and the end of the rotation axle 5 may be connected to the flushing unit 11 through a channel 27. Further, the stone rod 20 to be sawed can be supported to the feeding device 3 solely by using the support element 21 that comprises V-shaped support surfaces and an opening, through which the sawing sludge can flow to collection means 28.

Figure 4:
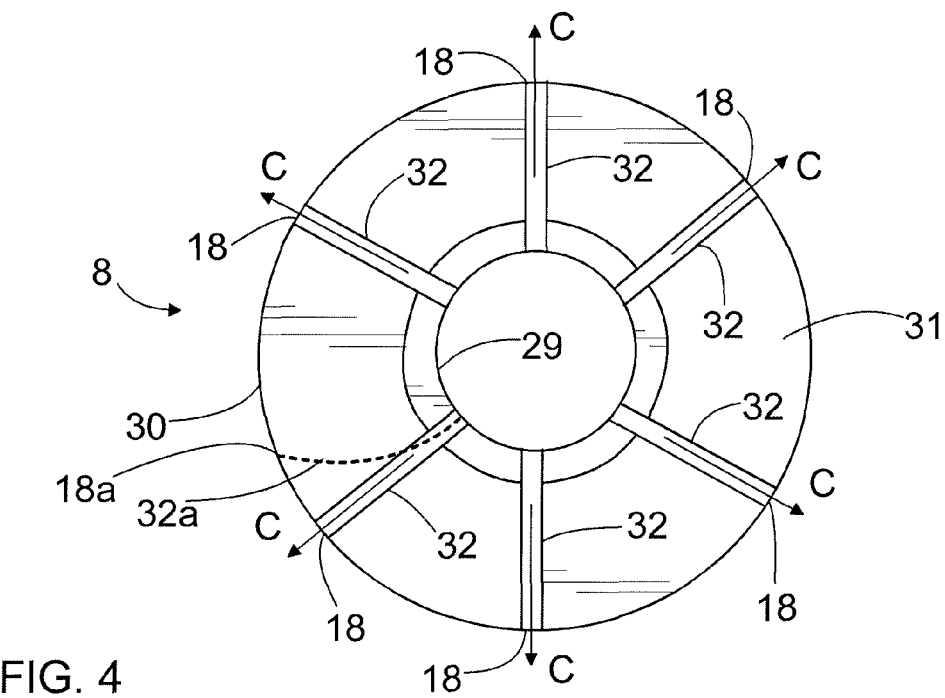
FIG. 4 is a schematic view of a blade flange and grooves in its support surface that form radial spray channels.

FIG. 4 shows a blade flange 8 that is an annular disc and comprises an inner circumference 29 and an outer circumference 30. Further, the blade flange 8 has a support surface 31 that may be an essentially planar surface arranged against a side surface of the blade frame of the circular blade. The support surface 31 of the blade flange 8 may have radial grooves 32. A dashed line 32*a* in FIG. 4 depicts a curved groove and a spray opening 18*a* at its end. The feeding of the flushing fluid can be affected by the cross-sectional shape of the grooves, the size of the cross-section, the longitudinal shape of the grooves, the number and direction of the grooves.

It should also be noted that the feeding of the flushing fluid can be affected in many ways. The flushing unit can be controlled to adjust the pressure and flow. Further, the stone saw can be equipped with different blade flanges that have different spray openings. The cross-section, number, shape, and direction of the spray openings can be implemented in different ways.

In some cases, features disclosed in this application may be used as such, regardless of other features. On the other hand, when necessary, features disclosed in this application may be combined in order to provide different combinations.

The drawings and the related description are only intended to illustrate the idea of the invention. The details of the invention may vary within the scope of the claims.

What is claimed is:

1. A stone saw comprising:
   a frame;
   a rotation axle extending along a longitudinal axis and supported to the frame, the rotation axle comprising a first end, a second end, and at least one axial-direction flushing channel;
   a circular blade with an outer circumference, a blade disc, and a working face on the outer circumference;
   at least one blade flange that is an annular piece, the at least one blade flange fastening the circular blade to the rotation axle, the at least one blade flange having plural crosswise spray openings that are each connected to the at least one axial-direction flushing channel of the rotation axle;
   a rotation device for rotating the rotation axle about the longitudinal axis, the first end of the rotation axle being connected to the rotation device;
   a support bearing that supports the rotation axle, at a location between the circular blade and the first end, to the frame, with a section of the rotation axle between the second end of the rotation axle and the support bearing forming a projecting section of the rotation axle that projects from the support bearing, wherein the at least one axial flushing channel extends along the projecting section of the rotation axle;
   a rotating connector mounted on the second end of the rotation axle;
   at least one feed channel connected to the rotating connector, wherein the at least one feed channel is connected to to the at least one axial-direction flushing channel of the rotation axle via the rotating connector;
   a feeding device, to which a stone object to be sawed is arranged and with which feeding device the stone object to be sawed is moved in relation to the circular blade during sawing; and
   a flushing system that comprises a flushing unit that is connected to the rotating connector by the at least one feed channel, the flushing unit for feeding pressurized flushing fluid into the at least one feed channel, and via the rotating connector, into the at least one axial-direction flushing channel extending along the projecting section of the rotation axle, and via the at least one axial flushing channel extending along the projecting section of the rotation axle, feeding the pressurized flushing fluid to each of the crosswise spray openings of the at least one blade flange, whereby the flushing fluid is fed out from each of the crosswise spray openings to the sawing site during sawing with the flushing fluid being fed through the crosswise spray openings to the sawing site in a crosswise direction of the rotation axle.

2. The stone saw as claimed in claim 1, wherein,
   the at least one blade flange comprise a first blade flange and a second blade flange, between which first and second blade flanges the circular blade is arranged for fastening the circular blade to the rotation axle; and
   the first blade flange and the second blade flange are both equipped with the crosswise spray openings, whereby the flushing fluid, fed from the at least one axial flushing channel extending along the projecting section of the rotation axle, is sprayable on both sides of the blade disc of the circular blade.

3. The stone saw as claimed in claim 1, wherein said spray crosswise openings are radially directed.

4. The stone saw as claimed in claim 1, wherein,
   the annular blade flange comprises an inner circumference and an outer circumference;
   the blade flange has a support surface to be arranged against the blade disc of the circular blade;
   the support surface has several grooves that extend from the inner circumference to the outer circumference of the blade flange and form spray channels together with the blade disc of the circular blade;
   and said spray channels are open on the outer circumference of the blade flange and form the crosswise spray openings for feeding the flushing fluid along the side of the blade disc of the circular blade.

5. The stone saw as claimed in claim 2, wherein said crosswise spray openings are radially directed.

\* \* \* \* \*